ANIMATING APPARATUS

Filed Nov. 1, 1963

3 Sheets-Sheet 1

INVENTORS.
WATHEL L. ROGERS
HERBERT B. TAYLOR
ROGER E. BROGGIE
BY FULWIDER, PATTON, RIEBER, LEE & UTECHT

ATTONEYS

INVENTORS.
WATHEL L. ROGERS
HERBERT B. TAYLOR
ROGER E. BROGGIE
BY FULWIDER, PATTON,
RIEBER, LEE & UTECHT
ATTORNEYS

INVENTORS.
WATHEL L. ROGERS
HERBERT B. TAYLOR
ROGER E. BROGGIE
BY FULWIDER, PATTON, RIEBER, LEE & UTECHT
ATTORNEYS

United States Patent Office 3,277,594
Patented Oct. 11, 1966

3,277,594
ANIMATING APPARATUS
Wathel L. Rogers, Lake View Terrace, Herbert B. Taylor, Glendale, and Roger E. Broggie, Burbank, Calif., assignors, by mesne assignments, to Wed Enterprises, Inc., a corporation of California
Filed Nov. 1, 1963, Ser. No. 320,886
20 Claims. (Cl. 40—28.3)

The present invention relates to an animating apparatus, and more particularly to an apparatus for selectively operating a plurality of frequency-responsive means which are coupled to movable members of a figure for the purpose of animating the figure, and for selectively operating associated electrical devices useful in heightening the realism of animation.

In the animation of figures, including those simulating human beings, animals, birds, and the like, it is essential that the figure be capable of a multiplicity of different motions in order to convincingly simulate the living being. Since each of the motions is provided by a separate mechanism, the animating apparatus must be capable of effecting selective operation of one or more of the mechanisms, as required, and in an unobtrusive manner in order not to detract from the illusion of life in the animated figure.

A number of systems have been advanced by the prior art to accomplish the desired animation, the most promising of which are those systems which employ frequency-responsive devices for actuating the movable members of the figure. The frequency-responsive devices are coupled to a magnetic tape recorder or the like which utilizes a multifrequency magnetic track or tracks to provide multifrequency output signals to the frequency-responsive devices.

The preparation of a multifrequency magnetic track has been a tedious process requiring manual application or "dubbing" of the appropriate frequency signals on the magnetic tape at the appropriate places. Even though time consuming, this does not pose a particularly difficult technical problem where only one movement is required, such as movement of the lower jaw of a figure simulating a human being. However, the programming of a magnetic tape to effect a variety of motions becomes technically complex as well. Thus, assuming that a figure simulating a human being is to be animated so that its motions correspond to an audio program which is a speech, the programmer using prior art systems is required to listen to the audio program and attempt to visualize the motions of the figure which should accompany the audio program to provide the desired realism.

Accordingly, certain words, such as those beginning with M or F, must be anticipated by the programmer to effect actuation of the mouth mechanism to close the mouth or pucker the lips in advance of the audio signal. This requires considerable skill to say the least. Moreover, the natural raising of a figure's arm, gesturing of its hand, nodding of its head, blinking of its eyes, and so on, present the programmer with an extremely difficult task. He must anticipate the necessity for such movements, operate the dubbing mechanism to apply the requisite frequency signal to the magnetic tape, and also be concerned with coordinating the multiplicity of frequency signals applied to the tape so that the figure is characterized by coordinated movements when the control tape is subsequently utilized for animation of the figure. Inability of the prior art systems to cope with such problems has resulted in figure animation which is greatly lacking in realism.

Existing animation systems are also usually characterized by on-off operation of the frequency-responsive devices which in certain applications results in a decidedly unlifelike behavior of the animated figure. Where the figure simulates a human being and the figure is programmed to raise its arm, an on-off actuation of the frequency-responsive arm mechanism results in a jerky, automaton motion of the arm, rather than the fluid, natural arm motion of the living being. Thus, the problem of moving the figure's arm at the appropriate time, and in coordination with the rest of the figure's motions, is further compounded in that the arm movement must be modulated to move at different rates as the position of the arm changes.

Accordingly, it is an object of the present invention to provide animation apparatus which is adapted to effect animation of a figure in a life-like manner and by equipment which is unobtrusive to the viewer.

Another object of the invention is to provide an animation apparatus of the aforementioned character which incorporates a plurality of frequency-responsive means coupled to movable parts of the figure and deriving their frequency signals from one or more tracks of a magnetic recording device, or from a frequency generator whose output is controlled by switching means. More particularly, the figure is animatable directly by the switch-selected frequencies of the frequency generator, or by the recorded program of the recording device and, most importantly, the apparatus is adapted to animate the figure by utilizing the switch-selected frequencies of the frequency generator and also simultaneously record the control frequencies on magnetic tape so that the tape may subsequently be utilized for automatically animating the figure.

With this arrangement for simultaneously animating the figure and recording the animating signals, the programmer may observe the figure during preparation of the program, thereby greatly enhancing his ability to observe the effect of the frequency signals which he selects for animation of the figure, and also permitting him to immediately correct or modify such signals when the animation appears to him to be unsatisfactory.

Another object of the present invention is the provision of an apparatus of the aforementioned character in which a switching means for selecting the frequencies to animate the figure is incorporated in a compact mechanism having a handle grip for the operator and which is characterized by a number of motions roughly corresponding to motions of the figure. Such hand-operated mechanism is particularly adapted for the animation of animal and bird figures capable of five or six motions in addition to the audio program. Thus, forward and backward tilting of the handle switch selects frequencies effective to produce a forward and backward motion of the bird, other motions of the handle effecting essentially similar movements of the figure, as will be described. The operator can then manipulate the handle and observe the resultant movement of the figure, correcting as necessary, and affording the figure a "personality" of its own which is permanently and simultaneously recorded on the magnetic tape of the associated recording device.

A further object of the invention is the provision of an apparatus of the aforementioned character in which another type of switching means is utilized to provide the more complex, modulated movements of a figure simulating a human being, for example. The switching means incorporates a plurality of potentiometer devices incorporated in a circuit which couples the multifrequency generator and the frequency-responsive devices connected to the movable parts of the figure. These potentiometers are mounted upon a harness which is worn by the programmer, and are so located on the harness that as the programmer moves his arms and body in the manner in which he desires that the figure move, the potentiometers sense the programmer's movement and each correspondingly attenuates the frequency with which it is associated. The frequency-responsive devices of the figure are of a type responsive to a varying D.C. signal, and are actuated in accordance with the amplitude of the control frequency signal, as will be seen. As in the case of the hand-manipulatable switching means, the harness switching means permits the programmer to animate the figure and simultaneously record the frequency signals effecting such animation, while also viewing the results of his animating movements on the figure.

A further object of the invention is the provision of animating apparatus of the aforementioned character wherein the mouth movements of the figure are precisly established prior to preparation of the final control tape and which, for this purpose, employs a film on which the audio signal appears as an optical track. The optical track affords the skilled programmer with a visual indication in many instances of the sounds which must be anticipated by a mouth closure, such as the M and F sounds. However, a more precise identification of the portions of the optical track which must be modified is afforded by driving the optical tape in synchronism with the audio tape so that the animated figure may be observed during the actuation of the mouth thereof by the optical tape, as will be seen. Discrepancies in the actual versus the desired mouth movements can then be corrected by modifying the optical tape, and the results of the modification immediately noted by again observing the mouth movements of the figure.

A further object of the invention is to provide an apparatus of the aforementioned character employing switch means to apply particular frequencies to the frequency-responsive means for animating the figure, and wherein the switching means permits a very precise timing of certain movements of the figure during the playing of the audio program. This is particularly important where the figure simulated is a human being and certain movements, such as eye blinks, frowns, and lip puckers, must occur precisely at the proper time. In the present apparatus this is accomplished by utilizing either a clear tape, to which are applied opaque strips for interrupting light beams as the tape is fed through a photoelectric switcher device, or a tape to which contact strips are applied for completing a circuit or circuits. Thus, precise movements of particular portions of the animated figure can be made a portion of the final magnetic control track simultaneously with actuation of the figure, in addition to or in substitution for movements afforded by the above-mentioned manually-gripped switch means or the harness means.

A further object of the invention is the provision of apparatus of the aforementioned character in which the sound track of the modified optical tape which is utilized to provide mouth movements, for example, is converted by an optical transducer to electrical current signals which are fed to the gain terminals of a variable gain amplifier. The resulting constant frequency mouth control signal is characterized by a varying amplitude and can be superimposed upon the audio signal track without interference therewith. Thus, both signals occupy a single track, the mouth control frequency being at a frequency level substantially imperceptible to a listener.

Another object of the invention is to provide an apparatus of the aforementioned character which is adapted to utilize a multifrequency, multitrack recorded program for substantially completely automatically effecting a multiplicity of movements of one or more figures to provide lifelike animation thereof.

Other objects and features of the invention will become apparent from consideration of the following description taken in connection with the accompanying drawings, in which.

Figure 1:
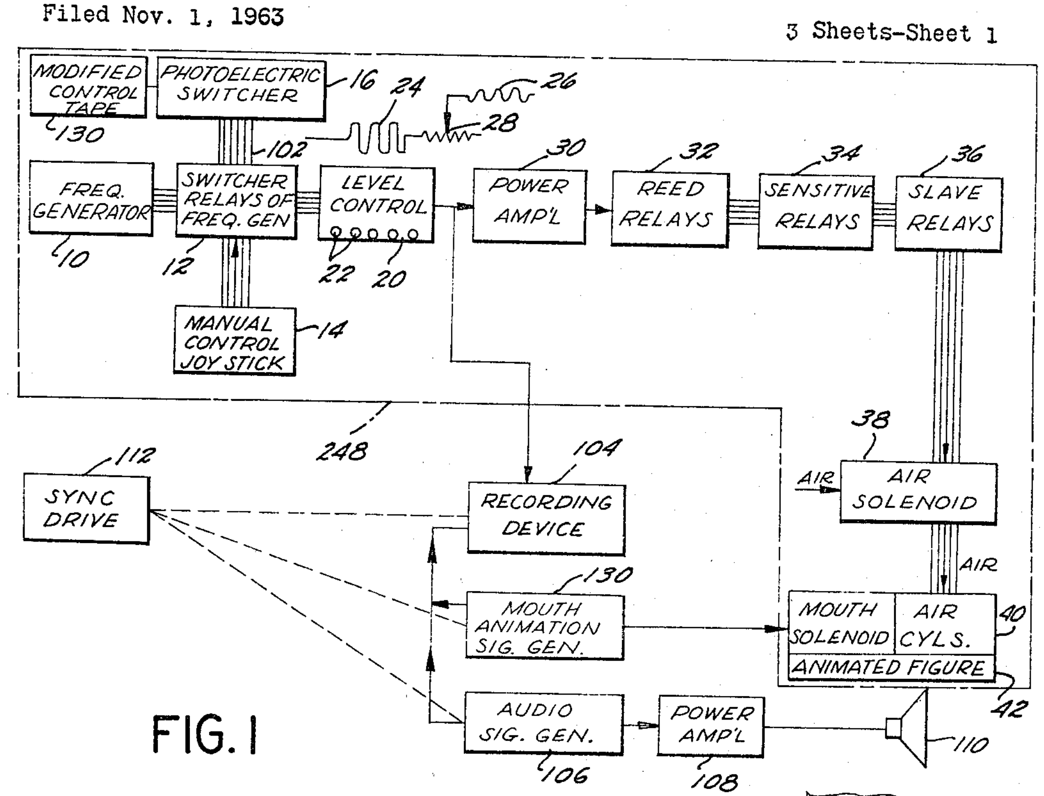
FIG. 1 is a schematic diagram of the apparatus of the present invention.

Referring now to the drawings, and particularly to FIGS. 1 through 4, there is illustrated an animation apparatus which includes a considerable number of commercially available components well known to those skilled in the art. Since such components form no part of the present invention, other than their use in combination with the other components of the apparatus, details of the structure and circuitry thereof will not be described. The inclusion of such details would only tend to confuse rather than clarify the nature of the present invention.

The animating apparatus includes a usual and conventional frequency generator 10 having a plurality of usual oscillators (not shown) capable of providing a corresponding plurality of different output frequencies, as will subsequently be described in greater detail. The frequency generator 10 is operated in one or both of two ways in the practice of the present apparatus. In one method of utilizing the outputs of the various generator oscillators, each of the oscillators is coupled to the output circuit only upon energization of the usual associated frequency oscillator relay, the feeding of the particular oscillator frequency into the circuit thus being an on-off operation. In another method of utilizing the outputs of the frequency generator oscillators, particularly those adapted to provide the higher frequency signals, the oscillators are always coupled in the output circuit, as by either bypassing the oscillator relays or maintaining them in a constantly energized state. The resulting frequency outputs are then varied in amplitude from maximum to zero amplitude, as will be seen.

Although the frequency generator relays which are energizable to couple their associated oscillators in the following circuit are normally an integral part of the frequency generator, such relays have been separately identified in the block diagram of FIG. 1 as switcher relays 12 of the frequency generator. This is done to facilitate an explanation of the different circuitry associated with the generator when it is utilized so that the relays thereof operate in on-off fashion, compared with the bypassing or constant energization of the relays to permit modulation of the frequency signals. In this regard, the block diagram of FIG. 1 utilizes single lines to indicate coupling of components, although it will be understood that the single line sometimes represents two or more electrical leads.

Figures 5, 10:
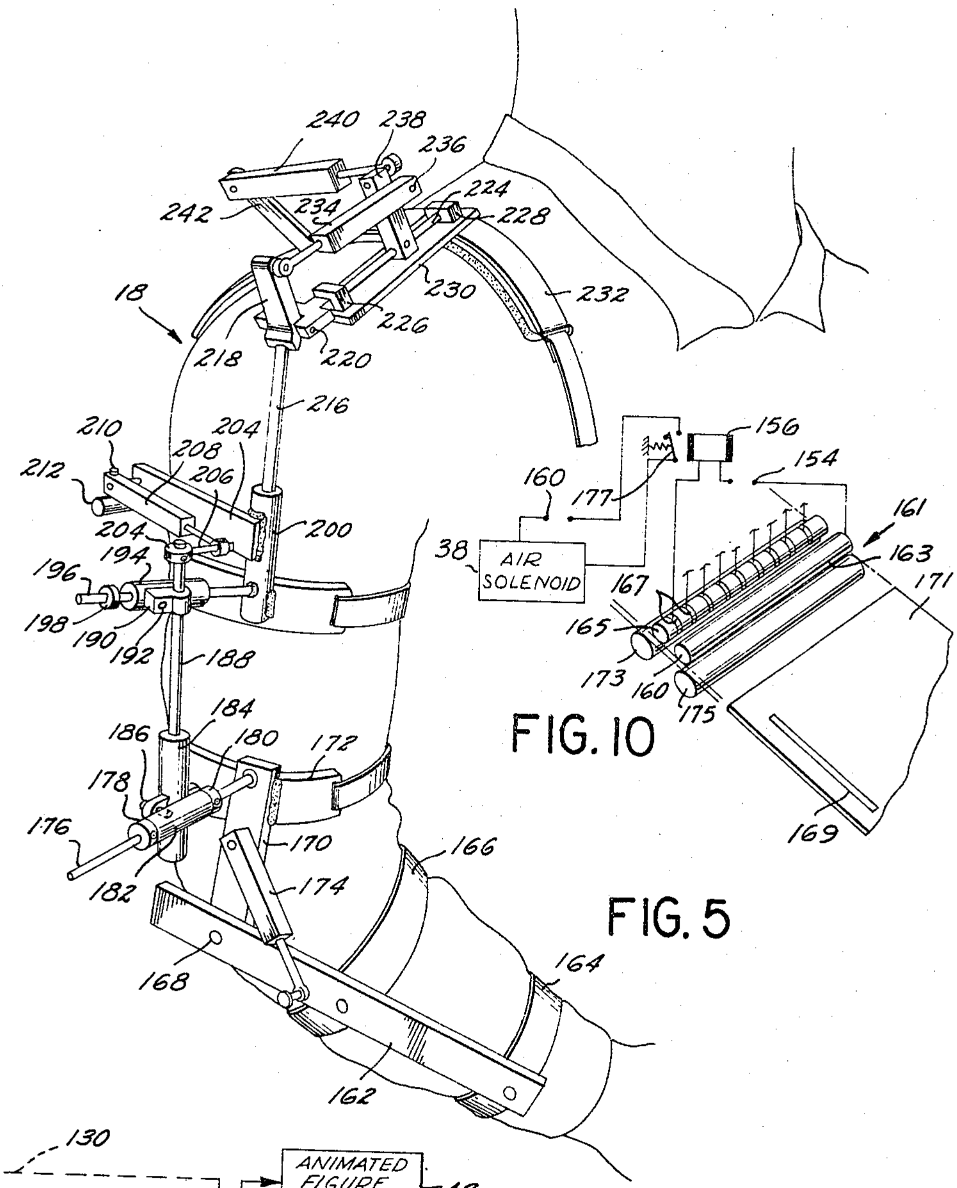
FIG. 5 is a perspective view of a switching means in the form of a harness adapted for wearing by the programmer.
FIG. 10 is a perspective, partially diagrammatic view of a contact switcher affording a function similar to that of the switcher of FIG. 9.

The selection of appropriate frequencies from the various frequencies provided by the generator 10 can be accomplished in any one or more of three ways according to the present invention. A manual control or "joy stick" 14 constitutes one form of switching means, another form of switching means being a photoelectric switcher 16, and yet another switching means being a harness switcher 18, which is illustrated in FIG. 5. The harness switcher 18 utilizes a circuitry responsive to amplitude-controlled usage of the frequency generator, as will be seen.

The present animating apparatus also includes a conventional level control 20 which is coupled to the output of the generator relays 12 and is provided with a plurality of usual potentiometers (not shown) operative to adjust the amplitude of the various frequency signals. A plurality of adjustment knobs 22 for this purpose are diagrammatically illustrated, each knob 22 being rotatable to effect potentiometric adjustment of the amplitude of the associated one of the frequency signals, lines for five different frequencies being indicated by way of example. The manner in which the amplitude of the signal coming from the relays 12 is modulated is schematically illustrated in FIG. 1, the incoming signal to the level control 20 being designated 24 and the outgoing signal from the level control 20 being designated 26, the adjustment by the knobs 22 being a potentiometric system, as designated at 28.

The effect of the level control 20 is to reduce the amplitude of the frequency signal from the generator relays 12 in an amount sufficient to avoid underdriving or overdriving the reed relays which constitute the frequency discriminating means of the embodiment presently being described, as will become apparent from the description hereinafter made. Once adjustment to the particular reed relays, the level control 20 ordinarily requires no further adjustment.

The multiplicity of frequency signals from the relays 12 are combined into a single multifrequency signal by the level control 20, and this composite signal is then suitably amplified by a power amplifier 30 and fed to a corresponding multiplicity of usual and conventional reed relays 32. Assuming that there are five elements of the figure which are to be moved, the five controlling frequencies are fed to five conventional, frequency discriminating or selective reed relays 32. The frequency discriminating characteristic of the reed relays effects separation from the composite signal of the frequencies to which the various reed relays 32 are sensitive. The separated frequencies then actuate their particular relays 32 which closes an associated circuit to apply D.C. current to a corresponding number of sensitive control relays 34. The latter are responsive to low current levels to actuate a corresponding plurality of slave relays 36 having a larger current capacity. The relays 36 are coupled to five solenoid air valves 38 and when energized apply D.C. current to the solenoids of the valves 38 to apply air under pressure to associated air valves 40 which are mounted to the animated figure 42. Although not shown, the relays 36 could be coupled to any electrically operated device which animates the figure or which controls associated lighting and equipment utilized to enhance the realism of animation of the figure.

An exemplary form of this type of frequency-responsive apparatus is more particularly described in our copending patent application, entitled "Animated Figure," filed November 1, 1963, and carrying Serial No. 320,696. In that application similar reed relays are utilized, the input to the relays is smoothed or evened, as shown therein, and the relays are tuned to resonate at different frequencies, each acts to separate out the frequency at which it is resonant to pass current to energize the coil of an associated sensitive relay, and this in turn effects energization of the coil of a slave relay to thereby cause energization of the solenoid of a solenoid-actuated air valve mounted upon a bird figure. By selective actuation of the air valves, the bird is animated as desired.

Thus, in the present application as well, actuation of one or more of the solenoid air valves 38 is effective to admit air to one side or the other of a corresponding one or ones of five usual air cylinders 40. The latter are coupled to the movable elements of the particular figure being animated (not shown) in any suitable fashion to effect the desired animation. Reference to animation of a bird is merely exemplary, since any figure having movable parts can be similarly animated through the utilization of frequency-responsive means including cylinders similar to the air cylinders 40. In this regard, it will be apparent that the cylinders 40 may be hydraulically rather than air-actuated, if desired.

Thus, the present apparatus is adapted to animate the figure 42 by utilization of the different frequencies of a frequency generator 10, selection of the appropriate frequencies to achieve the desired movements of the figure 42 being accomplished by the switcher 14 or 16, as will be seen. The switcher thus selects a particular frequency or frequencies to become part of the composite output signal from the level control 20 for actuation of the associated frequency-responsive means, which are each constituted by a reed relay 32, a sensitive relay 34, a slave relay 36, an air solenoid 38, and an air cylinder 40.

Figure 2:
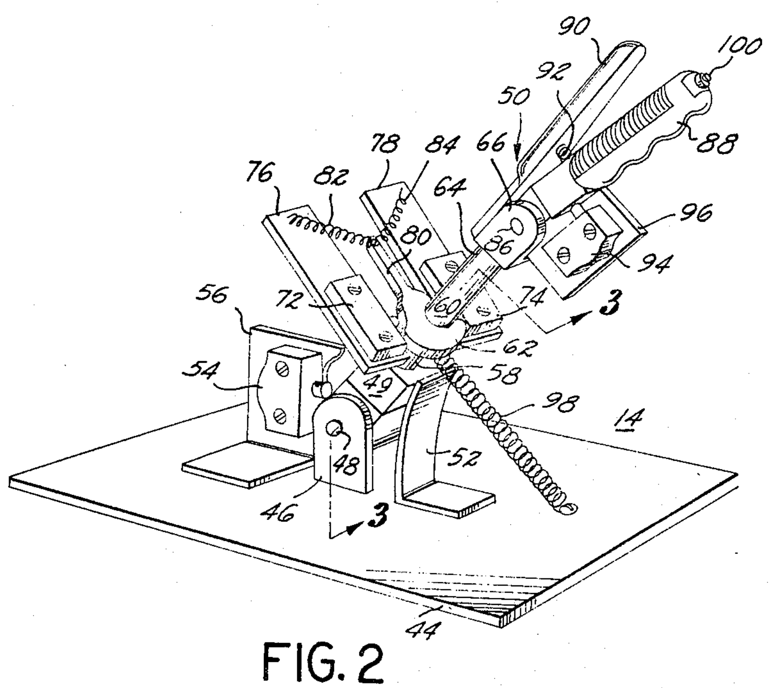
FIG. 2 is a perspective view of a switching means in the form of a manually-grippable device or joy stick.
Figures 3, 4:
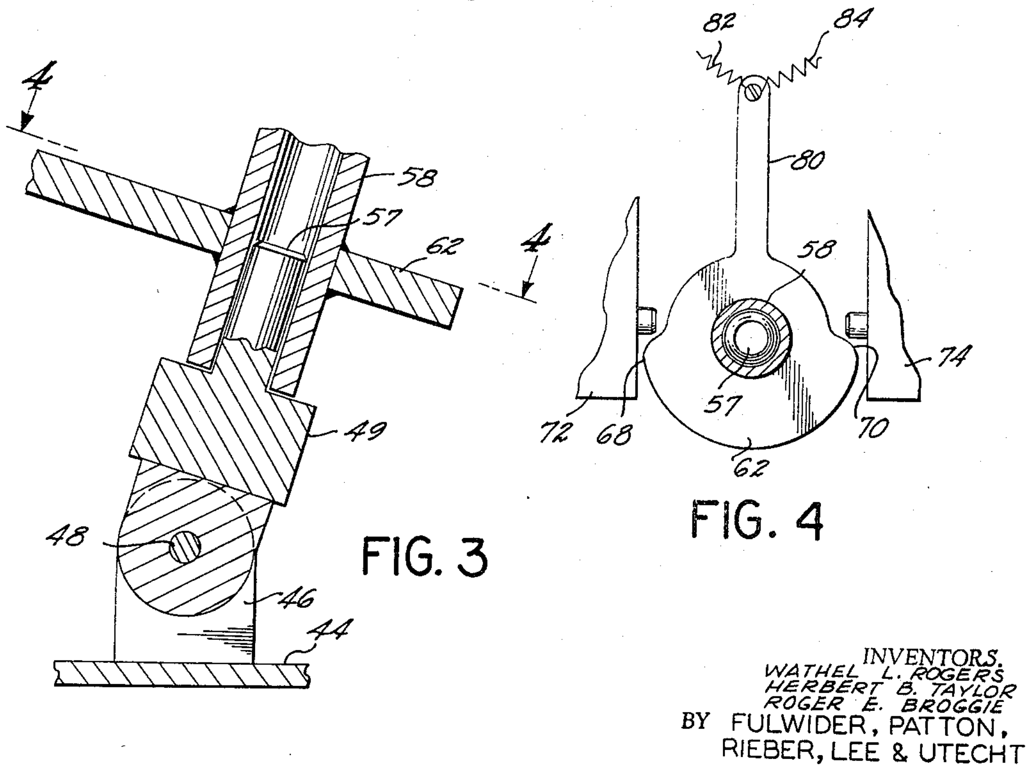
FIG. 3 is an enlarged detail side elevational view in cross-section taken along the line 3—3 of FIG. 2.
FIG. 4 is an enlarged detail view taken along the line 4—4 of FIG. 3.

The switching means constituted by the joy stick 14 is best illustrated in FIGS. 2 through 4, and comprises a horizontal platform 44 which mounts a pair of transversely spaced-apart shaft supports 46 (only one of which is illustrated in FIG. 2). The supports 46 rotatably carry a transverse shaft 48 which is secured to a lower portion 49 of a handle assembly 50.

The handle lower portion 49 is pivotable about the axis of the transverse shaft 48 between a normal, rearward position in engagement with a locating angle bracket 52 which is secured to the platform 44, and a forward position in engagement with the switch actuating element of a microswitch 54 mounted to a support angle bracket 56 secured to the platform 44. Thus, the handle lower portion 49 is pivotable forwardly with the handle assembly 50 to actuate the microswitch 54.

Integral with the upper extremity of the handle lower portion 49 is a rod 57 which is rotatable within a sleeve 58 of a handle intermediate portion 60.

The handle intermediate portion 60 also includes a cam 62 secured to the upper extremity of the sleeve 58, and a tubular element 64 secured at its lower extremity to the cam 62 and at its upper extremity to a bifurcated element 66, which also forms part of the intermediate handle portion 60. With this arrangement, the intermediate handle portion 60 is rotatable upon the lower handle portion 49, and about the axis of the tubular element 64, which axis is normal to the axis of the transverse shaft 48, as will be apparent.

The cam 62 includes a pair of substantially diametrically opposed shoulders 68 and 70, as best viewed in FIG. 4, which engage the switch-actuating elements of a pair of switches 72 and 74, respectively. The switches are mounted to a pair of laterally spaced plates 76 and 78 which are rigidly secured to the handle lower portion 49 and pivot therewith, but do not rotate with the intermediate handle portion 60. The cam 62 also includes a forwardly projecting and elongated element 80 extending between the plates 76 and 78 and mounting at its forward extremity the rearward extremities of a pair of identical tension springs 82 and 84. The forward extremities of the springs 82 and 84 are secured to the plates 76 and 78, respectively, and thus tend to maintain the handle intermediate portion 60 in a central position in which the shoulders 68 and 70 of the cam 62 are out of engagement with the switches 72 and 74.

The upper portion of the handle assembly 50 is mounted to the bifurcated element 66. Thus, a transverse shaft 86 carried by the element 66 pivotally mounts the lower extremity of an elongated movable handle section 88. A complemental elongated stationary handle section 90 is rigidly secured at its lower extremity to the forward face of the bifurcated element 66, and seats one end of a compression spring 92, the other end of which is seated in the movable handle section 88. The compression spring 92 exerts a bias tending to move the movable handle section 88 to a rearward position in engagement with the switch actuating element of a switch 94 mounted to a plate 96 which is rigidly secured to the bifurcated element 66.

The whole handle assembly 50 is normally biased to the rearward position illustrated in FIG. 2 by a tension spring 98 which is secured at its opposite extremities to the platform 44 and to the sleeve 58. The spring rate of the spring 98 is preferably less than that of the compression spring 92 so that the operator of the joy stick 14 is able to grasp the movable handle section 88 and apply a forwardly directed pressure to pivot the handle assembly 50 forwardly without causing disengagement of the movable handle section 88 from the switch 94.

Another switch 100 is mounted integral with the upper extremity of the movable handle section 88 in a position for depression by the operator's thumb when the operator is grasping the handle sections 88 and 90.

The various switches 54, 72, 74, 94, and 100 are each electrically coupled to the switcher relays 12 by suitable electrical leads 102, as indicated in FIG. 1.

Assuming, by way of example, that the joy stick 14 is to be utilized in actuating a bird figure like that described and illustrated in the above-identified co-pending application for United States Letters Patent, the various switches of the joy stick 14 are each assigned a desired movement for the bird. Accordingly, if the bird's head is to be tilted to provide a nodding effect, the switch 94 is preferably coupled to the particular relay of the switcher relays 12 which is adapted to control the frequency necessary to actuate the particular frequency-responsive means associated with the bird's head. Upon gripping of the handle assembly 50 in a manner which brings the movable handle section 88 forwardly into engagement with the stationary handle section 90, the switch 94 will be disengaged and complete the associated circuit which is effective to energize the corresponding relay of the switcher relays 12.

Similarly, the thumb-actuated switch 100 is preferably connected to the bird mechanism which is operative to cause expansion of the bird's chest.

The switch 54 is preferably connected to the body tilt apparatus of the bird so that pivotal movement of the handle assembly 50 about the transverse shaft 48, effecting engagement thereof with the switch 54, causes the bird's body to tilt forwardly.

The switches 72 and 74 are preferably associated with the head-turning mechanisms of the bird, actuation of the switch 72 causing the bird's head to rotate in one direction, and actuation of the switch 74 causing rotation of the bird's head in the opposite direction.

Thus, the joy stick 14 may be operated to cause any one or more of the five possible motions of the bird mechanisms, either singly or in combination, it being particularly noted that this can be accomplished by the operator simultaneously with observation of the bird so that the type of motion may be controlled as desired and errors in the bird's movements can be immediately corrected.

The output signals from the level control 20 may also be simultaneously applied to a recording device 104, which conveniently takes the form of a conventional magnetic tape recorder having a plurality of transducer heads adapted to handle a multiple track magnetic tape. Thus, the control signals which are selected by the joy stick 14 not only animate the figure 42 but also are simultaneously recorded by the recording device 104. If the operator of the joy stick 14 observes errors in the actuation or animation of the figure 42, the magnetic tape of the device 104 is run back and the appropriate control signals are applied to the tape.

The output of the level control 20 is a multifrequency signal which is applied to a single track of the magnetic tape, but it will be apparent that where a plurality of figures 42 are to be simultaneously actuated, the recording device 104 can simultaneously record the control signals for the various figures on separate, adjacent tracks of the magnetic tape. In this manner a plurality of figures can be simultaneously animated by a single multitrack control tape.

The above-described programming of the animation of the figure 42 is accomplished simultaneously with the audio program for proper coordination therewith. For this purpose an audio signal generator 106 is provided. The generator 106 may be any device operative to provide an audio output but is preferably a tape recorder which includes a reel of magnetic tape upon which the audio program is recorded. The output of the audio signal generator 106 is fed through a conventional power amplifier 108 to a usual loudspeaker 110 and is simultaneously applied to the recording device 104 so that the audio program is recorded on a magnetic track adjacent the magnetic track carrying the control signals emanating from the level control 20. The tracks are synchronized by a common synchronous drive 112 of any suitable type whereby the recording device 104 and signal generator 106 may be operated in unison in both forward and reverse directions. This permits correction of control signal errors and rerecordation of correct control signals without loss of coordination between the audio program and the control program. Such synchronous drives are well known in the movie industry and for brevity a description thereof will be omitted.

Figures 6, 7, 9:
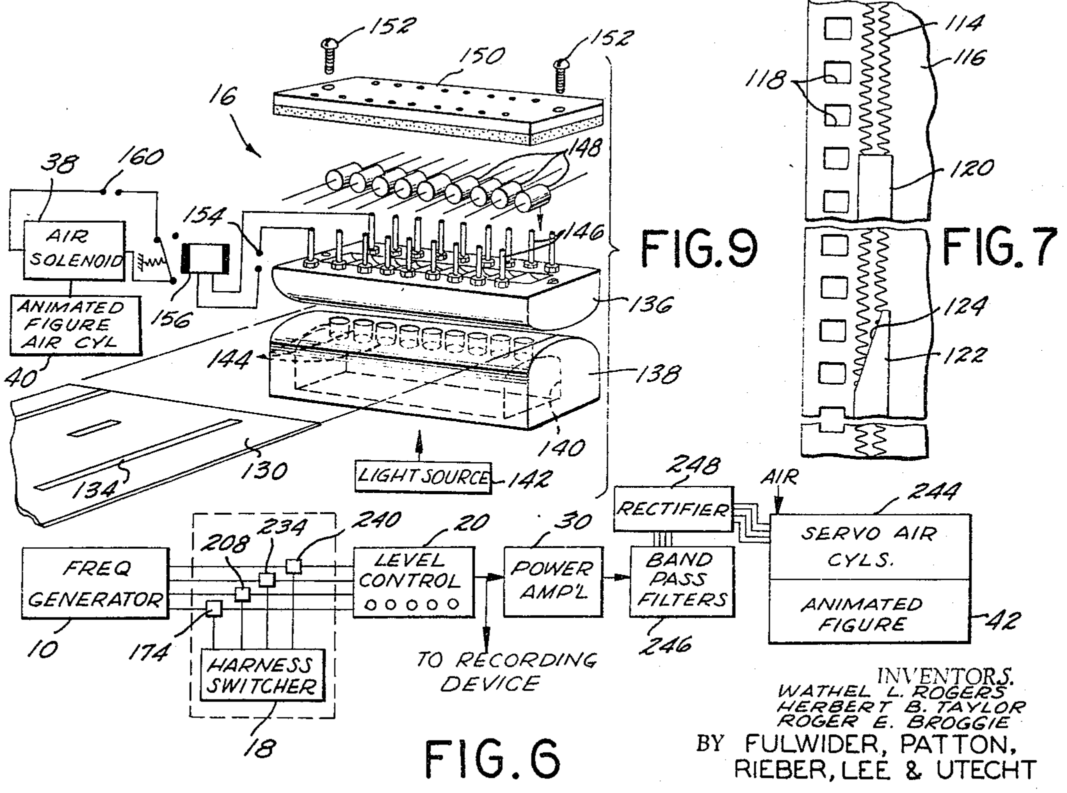
FIG. 6 is a diagrammatic showing of the circuit of the present apparatus employing the harness illustrated in FIG. 5.
FIG. 7 is a detailed view of a modified optical tape.
FIG. 9 is an exploded perspective view of a photoelectric switcher of the present apparatus, and including a showing of the circuit associated therewith.
Figure 8:
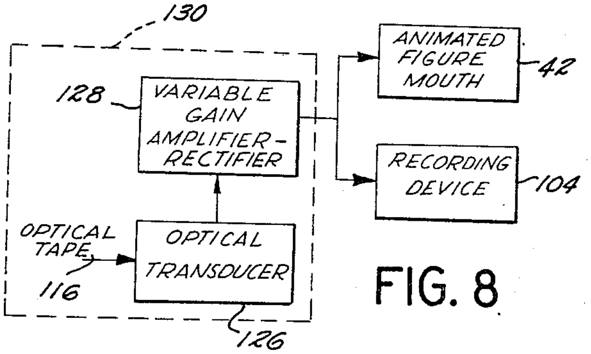
FIG. 8 is a diagrammatic showing of the circuit utilizing the optical tape of FIG. 7.

As best illustrated in FIGS. 1, 7, and 8, the audio program carried on the magnetic tape of the audio signal generator 106 is also preferably utilized for operating the mouth animation apparatus of a figure simulating a human being, since the strength of the audio signal generally corresponds with movements of the mouth. To accomplish this the audio program is applied to a magnetic tape in the usual manner, and run through a magnetic tape recorder. The output thereof is applied to the gain terminals of a variable gain amplifier to which is fed a constant frequency signal. The amplifier rectifies the A.C. signals so that the output of the amplifier is an amplitude-modulated A.C. signal, modulated in accordance with the character of the audio signal the louder sounds developing larger amplitude output signals. These output signals are smoothed, as will be apparent, and applied to either a solenoid directly coupled to the mouth mechanism or to the solenoid of an air solenoid valve which is effective to admit air to an air cylinder coupled to the mouth mechanism. In addition, these output signals may be applied to a servo air cylinder or the like for modulating the operation of the air cylinder whereby the mouth is then opened proportionate to the amplitude of the signal, and remains closed in the absence of such a signal. This latter application is more particularly described subsequently in connection with the harness switcher 18.

Since the output of the variable gain amplifier is at a constant frequency, which is preferably selected at a high enough frequency to be substantially inaudible to the human ear, it can be superimposed on the audio magnetic track.

However, in accordance with the present invention, the mouth animation control signals are modified before superimposition on the audio track to enhance the realism of mouth animation. More particularly, certain words, such as those beginning with the letters M, F, or V, are usually accompanied by a signal on the audio track which would open the mouth even though in actuality the mouth should remain closed. In other instances the audio signal would be effective to open the mouth fully, but for the sake of realism the mouth should be opened only partially.

Accordingly, in the present apparatus the magnetic audio tape is converted by means well known in the art, and particularly in the movie industry, to an optical track 114, as best illustrated in FIG. 7, which is carried on a length of acetate film 116 characterized by usual longitudinally spaced sprocket openings 118. The resultant film 116 is mounted on a reel and driven synchronously with the reel of magnetic tape carrying the audio track by the synchronous drive 112. However, to allow for control lag the optical tape is driven a suitable number of frames ahead of the audio tape.

At those points where the mouth is to be completely closed, a strip of opaque adhesive tape 120 is adhered to the film 116 in completely overlying relationship to the optical track 114. Where the mouth is to be only partially closed, a strip of tape 122 is applied over the optical track 114, the tape 122 in this instance being characterized by a bias or diagonal cut 124 which has the effect of gradually blocking out portions of the optical track 114. This procedure is followed for the entire length of the tracks, while simultaneously observing the effects of the modified tape on the figure, as will be seen. The optical track 114 may be rendered opaque in other ways as well, as by painting the appropriate portions of the tape 122 with opaque paint.

As best viewed in FIG. 8, the present apparatus permits actuation of the figure simultaneously with modification of the optical tape. This is accomplished by feeding the optical tape or film 116 into an optical transducer 126 operative to convert the optical tape track 114 into corresponding electrical signals, as is well known in the art. Such transducers, for example, are commonly found in projection apparatus in movie theaters and incorporate photoelectric sensitive means for converting the optical track to corresponding electrical signals. These signals are then used, as above-described, to control the output of a conventional variable gain amplifier-rectifier 128, the output of which is then electrically coupled to a power amplifier and thence to the animated figure 42. When the operator is satisfied with the observed animation, the output of the amplifier-rectifier 128 is then simultaneously applied to the recording device 104 to superimpose the modified control track upon the audio track. Of course, separate tracks may be utilized if desired. Referring to FIG. 1, the tape 116, the transducer 126, and the amplifier-rectifier 128 are identified as a signal generator 130, the output thereof being applied to the recording device 104, as previously indicated, simultaneously with application of the output of the audio signal generator 106 to the recording device 104. Synchronization is achieved by synchronous drive of the generators 106 and 130 by the drive 112, as indicated.

Referring now to FIG. 9, there is illustrated another form of switching means for operating the switcher relays 12, and which utilizes a length of clear acetate tape or film 130. The switching means in this case is constituted by the photoelectric switcher 16. The switcher 16 is particularly useful in achieving precise movements of an animated figure during, for example, a "speech" by a human-like figure. Certain brief but significant movements, such as lip puckers, eye blinks, and the like, add immeasurably to the realism of animation, and it has been found that the precise synchronization of such movements with the rest of the control program is best achieved by preparing the control tape separately and in advance of the preparation of the final control tape which incorporates all of the desired movements. Thus, a reel of the film or tape 130 is driven synchronously with the reel of magnetic tape carrying the audio program, and synchronously with the reel carrying the mouth animation control track, as by the synchronous drive 112, and at those points where an eye blink is desired, for example, the control tape 130 is modified.

More particularly, the tape 130 is wide enough to accommodate a plurality, in this case nine, of adjacent, longitudinally disposed tracks, a separate track for each of nine separate animation movements of, for example, the figure's eyes, lips, cheeks, forehead, and so on. The channel or track corresponding with the eye blink is covered by a length of opaque tape 134 at the proper place, the reels of audio tape, mouth animation tape, and the film 130 being stopped at this time.

The modified tape 130 is then led between the curvilinear, confronting faces of an upper block 136 and a lower block 138 of the photoelectric switcher 16. The lower block 138 is hollowed out to provide a light chamber 140 into which is directed a light beam from a suitably located light source 142, and nine vertically disposed openings 144 are provided in the lower block 138, each opening 144 affording separate communication between the light chamber 140 and the face of the block 138. With this arrangement, nine beams of light are directed upwardly in complemental relationship with the nine side-by-side channels of the tape 130.

The upper block 136 mounts nine paris of opposed terminals 146, and a photo-sensitive element 148 is mounted between the terminals of each pair of terminals 146. In addition, nine openings (not shown) are provided in the upper block 136 to permit light to pass from the nine openings 144 through the block 136 and against the photosensitive elements 148.

The photosensitive elements 148 are commercially available, solid-state devices which each, in effect, constitute a light-activated switch operative to close an electrical circuit upon exposure of the element to light.

The photosensitive elements 148 are secured in position by a cover plate 150 held in position by a pair of screws 152 threaded into the upper block 136, and opposite ends of each element 148 are connected across a source of power 154, only one such connection being illustrated in FIG. 9 for clarity. In addition, a separate relay 156 is connected in series with the source 154 and with one of the elements 148 for energization of the relay upon exposure of the element 148 to light. Thus, the nine relays 156 are constantly energized to maintain a corresponding plurality of switches 158 in normally open positions. Upon deenergization of each relay 156, when light is blocked to the corresponding photosensitive element 148, the associated switch 158 is biased to connect an associated solenoid of an air solenoid valve 38 with a source of power 160 to actuate the air cylinder 40 and effect the particular movement of the figure. The same result could be achieved, if desired, by utilizing a tape coated with opaque material and scraping or otherwise removing the opaque material where, for example, an eye blink is desired. In this case the photosensitive element 148 is actuated to close a switch to complete a circuit to the solenoid 38.

With the above arrangement, it will be apparent that as the tape 130 is fed between the blocks 136 and 138, the existence of opaque paint or material such as the strip of opaque tape 134 blocks light to the corresponding photosensitive element 148 which, in the assumed case, controls the eye blink mechanism. That is, the associated relay 156 is deenergized to effect actuation of the solenoid 38 of the eye blink air cylinder 40. The timing and effect of the eye blink may be observed upon the FIGURE 42 contemporaneously with observation of mouth movements of the figure caused by the simultaneously operated signal generator 130, while the observer also listens to the audio program simultaneously provided by the audio signal generator 106.

An identical photoelectric switcher 16 is coupled to the switcher relays 12 of the frequency generator 10, the leads from the terminals 146 being connected to the switcher relays in the same fashion as the just-described connection thereof to the relays 156. With this arrangement, after the tape 130 has been appropriately modified to provide the precise eye and mouth movements and the like, it is fed through the switcher 16 to tap off particular frequencies, depending upon which of the elements 148 is cut off from the light source. The capacity of the signal generator is such that a sufficient number of different frequencies are available for tapping off by the switcher 16 and also by the joy stick 14, although the frequencies selected are such that they are superimposable upon one another for later separation, as previously described. In this regard, care must be exercised to select frequencies which are not harmonics of any of the other frequencies utilized.

An analogous operation is provided by a contact switcher 161 illustrated in FIG. 10. Switcher 161 comprises a conductive rod 163 and an adjacent rod 165 made of electrical insulating material having nine, axially spaced conductor rings 167. Each ring 167 is connected in series with the rod 160, the relay 156, and a source of power 154, and the circuit is completed by a strip of electrically conducting material 169 applied to a length of nonconductive tape 171 guided beneath the rods 160 and 165 by a pair of guide pins 173 and 175. As in the case of the tape strips 134 of FIG. 9, the material 169 is applied where necessary to achieve the desired animation, as will be apparent, and completion of the relay circuit operates a switch 177 to operate the air solenoid 38. In all other respects the operation of the contact switcher 161 is the same as that of the switcher 16 of FIG. 9.

Referring now to FIGS. 5 and 6, the harness switcher 18 will next be described, it being recalled that this switching means is particularly adapted to provide modulated movements of a figure's arm, for example, so that the arm may be actuated to a particular position and stopped. In this case each of the frequency-responsive means includes a solenoid air valve and an air cylinder operated by such valve, the valve being responsive to a D.C. signal of varying strength to position the air cylinder piston in correspondence with the strength of such signal. Such devices are well known in the art and available on the market and will not therefore be described in detail, particularly in that the present apparatus is adapted to actuate any such device which is operative proportionally to the varying strength of an input signal. This is in contrast, for example, with the on-off nature of the control signal provided through the use of the joy stick 14.

Assuming that an arm movement of the figure is to be provided, and that four servo air cylinders of the type above-indicated are coupled to the movable portions of the figure's arm, it will be apparent that four separate control signals will be necessary. The present harness 18 is particularly adapted to control a figure in which the servo air cylinders are located as follows: one cylinder to control movement of the forearm relative to the upper arm; one cylinder located so as to effect rotational movement of the arm, as occurs when the elbow is bent and the hand is moved away from the body; another cylinder to move the arm inwardly and outwardly relative to the body; and another cylinder located to swing the arm forwardly and backwardly relative to the body. Of course, other cylinders or like devices to move the head, legs and other body portions could be similarly operated by a harness fitted to such body portions, the harness 18 for the arms of the operator being merely exemplary.

More particularly, the harness 18 is adapted to be strapped to the body of the operator, the portion of the harness 18 illustrated in FIG. 5 having its counterpart worn on the leftside of the operator's body. The illustration in FIG. 5 is confined to the right half of the harness 18 for brevity.

The harness 18 comprises an elongated forearm bar 162 which is secured to the forearm for movement therewith by straps 164 and 166. The upper or rearward extremity of the forearm bar 162 is pivoted at 168 to an elongated elbow bar 170. The upper extremity of the elbow bar 170 is brazed or otherwise rigidly secured to a rigid strap 172 secured to the upper arm of the operator. A switching means in the form of a conventional linear slide potentiometer 174 is connected between the bars 162 and 170, the body thereof being secured to the bar 170 and the slider thereof being secured to the bar 162 so that the potentiometer slider moves in proportion to relative movement of the operator's forearm and upper arm.

An elongated, laterally extending rod 176 is rigidly secured at its inner extremity to the rigid strap 172 and a pair of spaced-apart collars 178 and 180 are affixed to the rod 176 by set screws or the like. A cylindrical sleeve 182 is rotatably mounted upon the rod 176 between the collars 178 and 180, and a similar but normally arranged sleeve 184 is pivotally secured to the sleeve 182 by a pin 186, affording pivotal movement of the sleeve 184 toward and away from the longitudinal axis of the sleeve 182. In addition, the pin 186 ties the sleeves 182 and 184 together so that they pivot in unison about the rod 176.

A vertically oriented elongated rod 188 is axially slidable at its lower extremity within the sleeve 184 and its upper extremity is disposed through a bracket 190 for rotation about its longitudinal axis. The bracket 190 is pivotally secured by a pin 192 to an elongated, horizontally oriented sleeve 194, the pivotal action of the bracket 190 being toward and away from the longitudinal axis of the sleeve 194.

The sleeve 194, like the sleeve 182, is rotatable upon an elongated rod 196 which extends away from the upper arm of the operator substantially like the disposition and orientation of the rod 176. A stop collar 198 is secured to the outer extremity of the rod 196 by a set screw or the like to prevent the sleeve 194 from sliding off the rod 196. The inner extremity of the rod 196 is rigidly secured to a vertically oriented sleeve 200 which, in turn, is rigidly secured to a rigid strap 202 mounted to the upper portion of the operator's arm.

The upper end of the rod 188 rigidly mounts a collar 204 which includes an integral, laterally extending link 206 which is pivotally secured to the slider of a linear potentiometer 208. The body of the potentiometer is secured by a pin 210 for pivotal movement about a substantially vertical axis, the pin being carried by a support element 212. The support element 212 is itself mounted to a connecting strap 204 which is rigidly secured to the fixed sleeve 200, the mounting of the element 212 to the strap 204 being such that the element 212 is pivotable about a substantially horizontal axis.

With this arrangement, when the forearm of the operator is moved in a horizontal plane away from the body, for example, the rod 176 will be moved rearwardly of the rod 196, imparting torsion upon the rod 188. The consequent rotation of the rod 188 causes extension of the slide from the body of the potentiometer 208. In this manner, the movement of the potentiometer slider is proportional to the inward and outward swinging movement of the forearm relative to the upper arm.

Raising and lowering of the arm of the operator is sensed by another portion of the apparatus which comprises an elongated rod 216 axially slidably carried at its lower extremity within the open upper end of the sleeve 200. The upper extremity of the rod 216 is secured to one end of a rocker 218 which is pivotable about a pin 220 substantially aligned with the axis of pivotal movement of the operator's upper arm.

The pin 220 is carried by a bifurcated element 222 integral with a rod 224 extending along the shoulder line of the operator. The rod 224 is pivotable about its longitudinal axis, and is supported for such pivotable movement by a pair of bearing blocks 226 and 228 which are rigidly secured to a shoulder plate 230. The plate 230, in turn, is affixed to a rigid strap element 232 firmly secured or strapped to the operator's shoulder. This arrangement permits the rocker 218 to pivot about the axis of the rod 224 as the operator's arm is raised forwardly and rearwardly.

The upper extremity of the rocker 218 pivots as the operator's arm is raised outwardly of his body, and this pivotal movement is transmitted to the slider of a potentiometer 234, the body of which is pivotally secured by a pin 236 to a substantially vertically oriented, elongated element 238. The lower extremity of the element 238 is mounted to the rod 224 for pivotal movement therewith, and the upper extremity of the element 238 pivotally mounts the slider of a linear potentiometer 240. The body of the potentiometer 240 is pivotally secured to the upper extremity of a diagonally disposed strap 242 whose lower extremity is rigidly secured to the strap or element 232.

With this arrangement, when the operator raises his arm forwardly and upwardly, the rod 216 effects rearward pivotal movement of the element 238, causing the slider of the potentiometer 240 to be moved into the body thereof.

From the above it will be apparent that the various movements of the operator's arm are reflected in the changing positions of the sliders of the potentiometers 174, 208, 234, and 240. Referring now to FIG. 6, these potentiometers are electrically coupled into the circuits of four different frequencies emanating from the frequency generator 10. However, the switcher relays of the generator 10 are either bypassed, or constantly energized so that the four frequencies involved are constantly applied to the circuits which include the above-indicated potentiometers. Assuming that the circuits which include these potentiometers are coupled to four servo air cylinders 244 of the type above-described, and which are coupled to the figure mechanisms operative to accomplish the desired animation, amplitude variation of the selected frequencies will effect corresponding modulation of the operation of the servo air cylinders. Where the amplitude is adjusted to zero, the frequencies are shut off, the potentiometers thereby acting as switches.

More particularly, as illustrated in FIG. 6, the various potentiometers attenuate the amplitude of the frequencies in a manner identical to the attenuation effected by the potentiometer 28 of FIG. 1. The frequencies of various amplitudes are then fed to the level control 20, through the power amplifier 30, and then through a network of frequency-responsive means which, in this case, are constituted by usual bandpass filters 246. The output of the filter network 246 is then applied to a usual rectifier 248 and the varying D.C. outputs thereof are applied to the servo air cylinders 244.

It will be apparent that during the animation of the figure 42 in this manner the output of the rectifier 248 can simultaneously be applied to the recording device 104. This system of animating the figure 42 is thus characterized by simultaneous recording of the control track along with utilization of the control track for animation of the figure.

As was true in the case of the programming by the joy stick 14, the programming by the harness 18 is carried out simultaneously with a running of the audio and mouth animation tracks, the magnetic tape to which are applied the control signals produced by the apparatus of FIG. 6 being run simultaneously with the mouth animation signal generator 130 and the audio signal generator 106 by the drive 112. In this way the arm and similar body movements of the figure can be coordinated with the mouth movements and the audio program. In effect, the showing in FIG. 6 can be visualized as substituted for that portion of FIG. 1 surrounded by dash-dot lines, and the resulting showing indicates the analogous operation of the systems of FIGS. 1 and 6.

In this regard, it will be apparent that the potentiometers of the harness switcher 18 could be employed with the joy stick 14, instead of the switches thereof, to thereby permit usage of the joy stick 14 with servo air cylinders 244. Likewise, the switches of the joy stick 14 could be employed with the harness switcher 18, instead of the potentiometers thereof, to thereby permit usage of the harness switcher 18 with air cylinders 40.

From the foregoing it is seen that the apparatus of the present invention in its several embodiments provides animation of the figure and simultaneous recordation of the control signals for such animation. In addition, the different switching means described greatly simplify the accomplishment of realistic animation of the figure, use of the joy stick 14 and the harness 18 particularly reducing the burden on the programming operator in correctly animating the figure. Moreover, the present apparatus also includes photoelectric switching means 16 adapted to provide precise control signals exactly coordinated with the mouth animation movements and the audio program, and further includes means for modifying the audio track so that the modified audio track may be utilized for effecting mouth animation with a realism not possible were the audio track to be similarly used in an unmodified condition.

In the several embodiments herein described reference has been made to animation of a "figure," and this is intended to include actuation of associated electrical devices which tend to heighten the realism of animation, such as lights, horns, motor-driven platforms and the like. The important aspect of the invention in this regard is that all the various animation and allied effects may be caused to occur and be simultaneously recorded for subsequent automatic operation of the figure and its associated stage components. Accordingly, the claims which follow should be interpreted in a broad sense so that "animation" is not limited solely to the figure of interest.

Various modifications and changes may be made with regard to the foregoing detailed description without departing from the spirit of the invention or the scope of the following claims.

We claim:

1. Apparatus for simultaneously, animating, and preparing an animation program for, a figure having a movable member, said apparatus comprising:

electroresponsive means operative to move said movable member;

a recording device;

and control means adapted to provide electrical control signals to said electroresponsive means and to said recording device simultaneously whereby a program of recorded control signals can be prepared contemporaneously with observation of the figure being animated.

2. Apparatus for simultaneously animating, and preparing an animation program for, a figure having a movable member, said apparatus comprising:

frequency-responsive means operative to move said movable member;

a recording device;

and control means adapted to provide control signals at a predetermined frequency to said frequency-responsive means and to said recording device simultaneously whereby a program of recorded control signals can be prepared contemporaneously with observation of the figure being animated.

3. Apparatus for simultaneously animating, and preparing an animation program for, a figure having a movable member, said apparatus comprising:

actuator means responsive to a variable level electrical control signal to move said movable member according to the level of said signal;

a recording device;

and control means adapted to vary the level of an electrical control signal and apply said control signal to said actuator means and to said recording device simultaneously whereby a program of recorded control signals can be prepared contemporaneously with observation of the figure being animated.

4. Apparatus for simultaneously animating, and preparing an animation program, for a figure having a movable member, said apparatus comprising:

actuating means responsive to a predetermined frequency for operating said movable member;

a recording device;

a frequency generator operative to provide said predetermined frequency;

and switching means for selectively applying said frequency to said actuating means and to said recording device simultaneously to move said movable member and simultaneously record said frequency for subsequent use in operating said actuating means independently of said switching means.

5. Apparatus for simultantously animating, and preparing an animation program for, a figure having a plurality of movable members, said apparatus comprising:

a plurality of frequency-responsive means for coupling to said movable members, respectively, and each separately responsive to a different frequency to move a separate one of said members;

a recording device;

a multifrequency generator operative to provide a plurality of frequencies;

and switching means for selecting certain ones of said frequencies for application to corresponding ones of said plurality of frequency-responsive means, respectively, and to said recording device to move the associated ones of said movable members and simultaneously record said certain ones of said frequencies for subsequent use in controlling said frequency-responsive means independently of said switching means.

6. Apparatus for simultaneously animating, and preparing an animation program for, a figure having a plurality of movable members, said apparatus comprising:

a plurality of frequency-responsive means for coupling to said movable members, respectively, and each separately responsive to a different frequency to move a separate one of said members;

a recording device;

a multifrequency generator operative to provide a plurality of frequencies;

and switching means including a plurality of switches in circuit with said generator and said plurality of frequency-responsive means, and a manually actuable handle movable in a multiplicity of directions to operate said switches for selecting certain ones of said frequencies for application to corresponding ones of said plurality of frequency-responsive means, respectively, and to said recording device to move the associated ones of said movable members and simultaneously record said certain ones of said frequencies for subsequent use in controlling said frequency-responsive means independently of said switching means.

7. Apparatus for simultaneously animating, and preparing an animation program for, a figure having a plurality of movable members, said apparatus comprising:

a plurality of frequency-responsive means for coupling to said movable members, respectively, and each separately responsive to a different frequency to move a separate one of said members;

a recording device;

a multifrequency generator responsive to electrical switching signals to provide a plurality of frequencies;

and switching means for selecting certain ones of said frequencies for application to corresponding ones of said plurality of frequency-responsive means, respectively, and to said recording device to move the associated ones of said movable members and simultaneously record said certain ones of said frequencies for subsequent use in controlling said frequency-responsive means independently of said switching means, said switching means including a plurality of photosensitive devices adapted to provide said switching signals in response to adjustment of light intensity thereon.

8. Apparatus for simultaneously animating, and preparing an animation program for, a figure having a plurality of movable members, said apparatus comprising:

a plurality of frequency-responsive means for coupling to said movable members, respectively, and each separately responsive to a different frequency to move a separate one of said members;

a recording device;

a multifrequency generator operative to provide a plurality of frequencies;

and switching means including a harness to be worn by an operator, sensing devices mounted to said harness and connnected to said generator and adapted to sense movements of said operator and select certain ones of said frequencies for application to corresponding ones of said plurality of frequency-responsive means, respectively, and for application to said recording device to move the associated ones of said movable members and simultaneously record said certain ones of said frequencies for subsequent use in controlling said frequency-responsive means independently of said switching means.

9. Apparatus for animating a figure having a plurality of movable members, said apparatus comprising:

a plurality of frequency-responsive means for coupling to said movable members, respectively, and each separately responsive to a different frequency to move a separate one of said members;

a multifrequency generator operative to provide a plurality of frequencies;

and switching means including a longitudinally extending, manually-grippable handle assembly having a pair of portions rotatable relative to each other about said longitudinal axis, said handle assembly further having a grip element movable toward said longitudinal axis upon squeezing thereof by an operator, means mounting said handle assembly for pivotal movement about a transverse axis, and a plurality of switches in circuit with said generator and actuable upon movement of said handle assembly and said portions and said grip element thereof for selecting certain ones of said frequencies for application to corresponding ones of said plurality of frequency-responsive means, respectively, to move the associated ones of said movable members.

10. Apparatus for animating a figure having a plurality of movable members, said apparatus comprising:

a plurality of frequency-responsive means for coupling to said movable members, respectively, and each separately responsive to a different frequency to move a separate one of said members in correspondence with the amplitude of said frequency;

a multifrequency generator operative to provide a plurality of frequencies;

and switching means including a harness adapted to be worn by an operator and having a plurality of fixed members secured to the operator and movable in response to movements by said operator, a plurality of sensing means connected between said fixed members for sensing relative movements therebetween and coupled in circuit with said generator for modulation of the amplitude of said frequencies for application to corresponding ones of said plurality of frequency-responsive means, respectively, to move the associated ones of said movable members in correspondence with said modulation.

11. Apparatus for animating a figure having a plurality of movable members, said apparatus comprising:

a plurality of frequency-responsive means for coupling to said movable members, respectively, and each separately responsive to a different frequency to move a separate one of said members;

a multifrequency generator operative to provide a plurality of frequencies;

and switching means including a plurality of photosensitive elements connected in circuit with said generator, an elongated tape having opaque portions, a light source, and means guiding said tape between said source and said photosensitive elements for actuating said photosensitive elements in accordance with the opacity of said tape thereby to select certain ones of said frequencies for application to corresponding ones of said plurality of frequency-responsive means, respectively, to move the associated ones of said movable members.

12. A method for simultaneously animating, and preparing an animation program for a figure having a plurality of movable members, said method comprising the steps of:

synchronously driving a recording device and an audio signal generator;

applying the output of said generator to said recording device and to a loudspeaker;

electrically controlling the movements of said plurality of movable members by application of electrical signals thereto in synchronism with said driving of said recording device and said generator;

and simultaneously applying said electrical signals to said recording device for recording.

13. A method for simultaneously animating, and preparing an animated program for a figure having a plurality of movable members, said method comprising the steps of:

synchronously driving a recording device, a mouth animation signal generator, and an audio signal generator;

applying the outputs of said generators to mouth animation mechanism of the figure and to a loudspeaker, respectively, and also simultaneously to said recording device;

electrically controlling the movements of said plurality of movable members by application of electrical signals thereto in synchronism with said driving of said recording device and said generators;

and simultaneously applying said electrical signals to said recording device for recording.

14. A method for controlling movements of the mouth mechanism of an animated figure by utilizing an audio program and comprising the steps of:

converting said audio program to an optical sound track on film;

modifying said optical sound track by rendering certain portions thereof opaque;

and converting the modified said optical sound track into electrical signals for application to said mouth mechanism for controlling the movements thereof, said certain portions of said optical sound track which are opaque effecting adjustments of the movements of the mouth mechanism according to the extent and location of the opaque areas of said certain portions.

15. A method for controlling movements of the mouth mechanism of an animating figure by utilizing an audio program and comprising the steps of:

converting said audio program to an optical sound track on film;

modifying said optical sound track by applying opaque material over portions of said optical sound track;

converting the modified said optical sound track into electrical signals;

applying said electrical signals to the gain terminals of a variable gain amplifier and rectifier to obtain a modulated output;

superimposing said output upon a recording of the audio program;

and simultaneously converting the composite record of said output and said audio program to said mouth mechanism and to a loudspeaker for controlling the movements of said mouth mechanism synchronously with operation of said loudspeaker, said portions of said optical sound track which are opaque effecting adjustments of the movements of said mouth mechanism according to the extent and location of the opaque areas of said portions.

16. A method for preparing a control tape for effecting movements of movable portions of an animated figure precisely coordinated with movements of the mouth mechanism of the figure, said method comprising the steps of:

driving a transparent tape through a photosensitive switching means adapted to control movements of said movable portions according to the opacity of said tape;

driving a mouth animation tape synchronously with said driving of said transparent tape to actuate means for effecting movements of said mouth mechanism;

stopping the driving of said tapes and altering the opacity of said transparent tape at a particular location;

and again driving said tapes in synchronism for observation of the coordination between movements of said mouth mechanism and movements of said movable portions of said figure effected by the alterations in said opacity.

17. In apparatus for animating a figure having a plurality of movable members, switching means for controlling a plurality of circuits for effecting simultaneous and coordinated movements of said movable members, said switching means comprising:

a longitudinally extending handle assembly having a first portion and a second portion rotatable relative to said first portion about the longitudinal axis of said handle assembly;

a pair of switches carried by said first portion and alternately actuable by said second portion upon rotation of said second portion in opposite directions about said longitudinal axis;

means mounting said handle assembly for pivotal movement about a transverse axis;

a switch carried by said means and actuable upon said pivotal movement of said handle assembly;

a grip portion mounted upon said handle assembly for pivotal movement toward said longitudinal axis;

a switch mounted to said handle assembly and actuable upon said pivotal movement of said grip portion;

and means for connecting said switches in the plurality of said circuits, respectively, for controlling said movements of said movable members.

18. A method for preparing a control tape for effecting movements of movable portions of an animated figure precisely coordinated with movements of the mouth mechanism of the figure, said method comprising the steps of:

driving a contact tape through a contact switcher adapted to control movements of said movable portions according to the position of electrically conductive material applied to said contact tape;

driving a mouth animation tape synchronously with said driving of said contact tape to actuate means for effecting movements of said mouth mechanism;

stopping the driving of said tapes and applying electrically conductive material to said contact tape at a particular location;

and again driving said tapes in synchronism for observation of the coordination between movements of said mouth mechanism and movements of said movable portions of said figure effected by the application of such conductive material.

19. Apparatus for coordinated actuation of a plurality of electroresponsive devices, said apparatus comprising:

a plurality of frequency-responsive means for coupling to said devices, respectively, and each separately responsive to a different frequency to actuate a separate one of said devices;

a multifrequency generator operative to provide a plurality of frequencies;

and switching means including a plurality of photosensitive elements connected in circuit with said generator, an elongated tape having opaque portions, a light source, and means guiding said tape between said source and said photosensitive elements for actuating said photosensitive elements in accordance with the opacity of said tape thereby to select certain ones of said frequencies for application to corresponding ones of said plurality of frequency-responsive means, respectively, to actuate the associated ones of said devices.

20. Apparatus for producing a magnetic tape for use in coordinated actuation of a plurality of electroresponsive devices, said apparatus comprising:

a magnetic tape recording and transducing device;

a multifrequency generator operative to provide a plurality of frequencies;

and switching means including a plurality of photosensitive elements connected in circuit with said generator, an elongated tape having opaque portions, a light source, and means guiding said tape between said source and said photosensitive elements for actuating said photosensitive element in accordance with the opacity of said tape thereby to select certain ones of said frequencies for application to the tape of said tape recording and transducing device for subsequent use of said tape in actuating said plurality of electroresponsive devices.

References Cited by the Examiner

UNITED STATES PATENTS

| | | | |
|---|---|---|---|
| 2,213,512 | 9/1940 | Bailer | 40—28.3 |
| 2,700,250 | 1/1955 | Williams | 40—28.3 |
| 2,704,417 | 3/1955 | Evans | 46—126 X |
| 2,867,049 | 1/1959 | Brackensey | 40—28.3 |
| 2,890,535 | 6/1959 | Kenworthy | 40—28.3 |

FOREIGN PATENTS

| | | | |
|---|---|---|---|
| 965,917 | 8/1964 | Great Britain. | |

EUGENE R. CAPOZIO, *Primary Examiner.*

WENCELSO J. CONTRERAS, *Assistant Examiner.*

UNITED STATES PATENT OFFICE
CERTIFICATE OF CORRECTION

Patent No. 3,277,594 October 11, 1966

Wathel L. Rogers et al.

It is hereby certified that error appears in the above numbered patent requiring correction and that the said Letters Patent should read as corrected below.

Column 3, line 13, for "precisly" read -- precisely --; column 5, line 26, for "adjustment" read -- adjusted --; column 10, line 11, for "paris" read -- pairs --; lines 52 and 53, for "FIGURE" read -- figure --; column 14, line 67, for "program, for" read -- program for, --; column 17, line 64, for "record-" read -- recording --;

Signed and sealed this 5th day of September 1967.

(SEAL)
Attest:

ERNEST W. SWIDER
Attesting Officer

EDWARD J. BRENNER
Commissioner of Patents